United States Patent

Hopt et al.

(10) Patent No.: US 6,830,191 B2
(45) Date of Patent: Dec. 14, 2004

(54) CARD READER WITH TRANSPORT ROLLERS MOUNTED ON PIVOT ARMS

(75) Inventors: Jurgen Hopt, Rottweil (DE); Hans-Jochen Rapp, Rottweil (DE); Michael Storz, Constance (DE)

(73) Assignee: ddm hopt + schuler GmbH & Co. KG (DE)

( * ) Notice: Subject to any disclaimer, the term of this patent is extended or adjusted under 35 U.S.C. 154(b) by 127 days.

(21) Appl. No.: 10/203,039

(22) PCT Filed: Feb. 2, 2001

(86) PCT No.: PCT/DE01/00398

§ 371 (c)(1),
(2), (4) Date: Sep. 18, 2002

(87) PCT Pub. No.: WO01/59695

PCT Pub. Date: Aug. 16, 2001

(65) Prior Publication Data

US 2003/0075607 A1 Apr. 24, 2003

(30) Foreign Application Priority Data

Feb. 9, 2000 (DE) .......................... 100 05 358

(51) Int. Cl.⁷ .............................................. G06K 13/00
(52) U.S. Cl. ...................................................... 235/475
(58) Field of Search ................................ 235/475, 380, 235/379, 477, 479

(56) References Cited

U.S. PATENT DOCUMENTS

| | | | |
|---|---|---|---|
| 4,442,769 A | | 4/1984 | Kallin |
| 4,684,794 A | | 8/1987 | Holland-Letz |
| 5,646,392 A | * | 7/1997 | Oguchi ........................ 235/475 |
| 5,689,105 A | * | 11/1997 | Mizoguchi et al. ......... 235/475 |
| 6,135,440 A | * | 10/2000 | Lynch et al. .................. 271/34 |
| 6,604,678 B2 | * | 8/2003 | Hopt et al. .................. 235/475 |

FOREIGN PATENT DOCUMENTS

| | | |
|---|---|---|
| DE | 34 41 849 C2 | 11/1984 |
| DE | 42 07 778 C2 | 3/1992 |
| EP | 0 687 990 A2 | 12/1995 |
| GB | 2 327 667 A | 2/1999 |
| JP | 10207989 | 8/1998 |

* cited by examiner

Primary Examiner—Thien M. Le
(74) Attorney, Agent, or Firm—Walter A. Hackler

(57) ABSTRACT

In a card reader (40) with at least two transport rollers (23, 24, 25) for the card (3) arranged one after the other in the card infeed direction, the transport rollers (23, 24, 25) are provided on a pivot arm (21, 22), which can be pivoted against the action of a restoring force in a plane at right angles to the card path, at a distance from the pivot axis (26, 27) of the pivot arm (21, 22). When a transport roller on the pivot arm is deflected by the card thickness of a card that has been fed in, all transport rollers lying further from the pivot axis are also deflected, i.e. pivoted out of the card path, by more than the card thickness.

11 Claims, 3 Drawing Sheets

CARD READER WITH TRANSPORT ROLLERS MOUNTED ON PIVOT ARMS

The invention relates to a card reader with at least two transport rollers for the card arranged one after the other in the card infeed direction.

Card readers are used for data exchange, for example with a magnetic card, on the magnetic strip of which the data are stored, or with a chip card, on the chip or integrated circuit of which the data are stored.

Card readers with transport rollers are known, which draw the card into a position for data exchange and, after the data exchange, either transport it back again or transport it further in the infeed direction. In the data exchange position, the card is read by means of a reading head, which lies opposite a middle transport roller and thus simultaneously forms the opposing support for the transported card. Before and after this middle transport roller a further transport roller is provided in each case, all three of the transport rollers being deflectable out of the card path against the action of a restoring force.

In this known card reader, when the card, driven by the middle transport roller, is moved backwards and forwards past the write/read head for an exchange of data, the card is forced to run into the front or rear transport rollers, which have not been deflected, so that these are deflected if the occasion arises. This striking of the card against other transport rollers, especially while an exchange of data is currently taking place, has an adverse effect on the way in which the card reader works and can lead to faults and errors in the data exchange.

It is therefore the object of the invention to develop a card reader of the type mentioned in the introduction in such a way that, if possible, a card is not able to strike against other transport rollers while it is being transported by the one transport roller.

SUMMARY OF THE INVENTION

According to the invention, this object is achieved in that the transport rollers are provided on a pivot arm, which can be pivoted against the action of a restoring force in a plane at right angles to the card path, at a distance from the pivot axis of the pivot arm.

The important advantage of the card reader according to the invention consists in its transport rollers being pivoted further out of the card path the further they are spaced from its pivot axis when the pivot arm is displaced. Therefore, when a transport roller on the pivot arm is deflected by the card thickness of a card that has been fed in, all transport rollers lying further from the pivot axis are deflected, i.e. pivoted out of the card path, by more than the card thickness.

The pivot axis of the pivot arm can be provided after or before the transport rollers on the pivot arm in the card infeed direction.

With particular preference, a pivot arm, the pivot axis of which is provided after its transport rollers in the card infeed direction, and a pivot arm, the pivot axis of which is provided before its transport rollers in the card infeed direction, are coupled together so that their movements oppose one another. By means of this measure, it is ensured that both pivot arms always pivot together like a pair of scissors if the card, which is fed in, deflects one of the transport rollers out of its card path.

The opposing movement coupling can, for example, be achieved by the two pivot arms being connected together in an articulated manner between their two pivot axes. It is of particular advantage if the two pivot arms are connected together in an articulated manner via the axis of rotation of a transport roller common to both pivot arms. If this common transport roller for both pivot arms is also the nearest transport roller to the pivot axes, all other transport rollers are always deflected further than this common transport roller.

Advantageously, a read and/or write head of the card reader is provided in the area of the common transport roller. This measure has the advantage that the card, driven only by the common transport roller, can be moved past the read and/or write head equally far in both directions.

The restoring force can, for example, be formed by a spring acting on the articulated connection of the two pivot arms so that the transport rollers of both pivot arms are pre-stressed in their position encroaching on the card path.

In an embodiment of the invention, which is particularly simple from the design point of view, the transport rollers are mounted between the two side walls of a pivot arm, which is U-shaped in cross section. With this, it is preferred that the one U-shaped pivot arm is narrower than the other U-shaped pivot arm and encroaches between its side walls.

Furthermore, an opposing roller is provided for each transport roller, in each case on the side of the card path opposite the transport rollers, as an opposing support for the transported card.

Further advantages of the invention can be seen from the description and the drawing. Likewise, the characteristics mentioned above and those that are further specified can, according to the invention, in each case be used singly or severally in any combination. The embodiments shown and described are not to be understood as a definitive list, but rather they have more of an exemplary character to illustrate the invention.

DETAILED DESCRIPTION

Figure 1A:
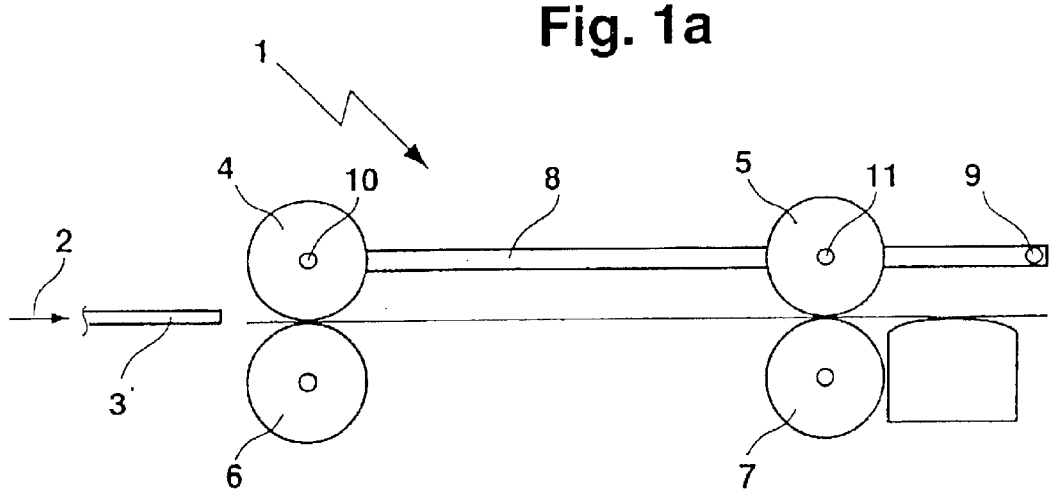
FIGS. 1a–1c show schematically the sequence of movement in a card reader according to the invention with one pivot arm when feeding in a card at three different points in time.
Figure 1B:
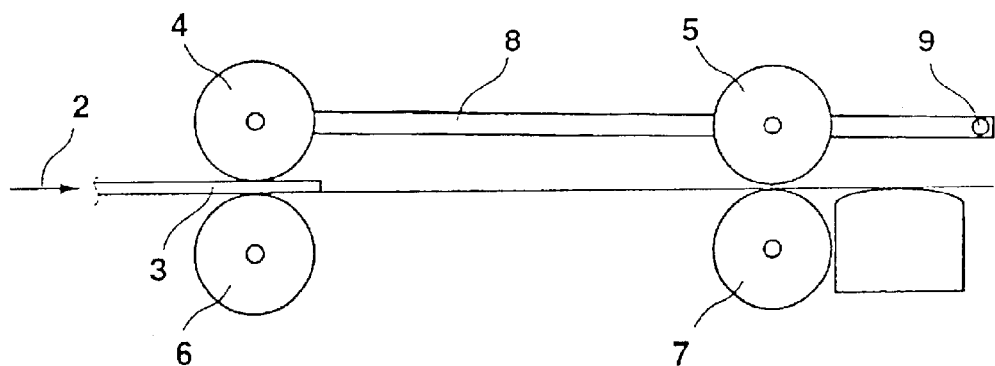
Figure 1C:
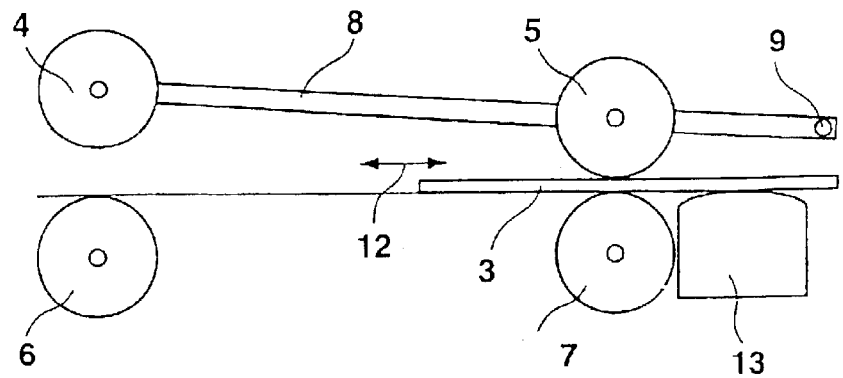

The card reader 1 shown schematically in FIGS. 1a–1c includes two transport rollers 4, 5, arranged one after the other in the infeed direction 2 of the card 3, by means of which the card 3 can be transported in and against the infeed direction 2. On the side of the card path opposite the transport rollers 4, 5, opposing rollers 6, 7 are provided in each case as rigidly mounted opposing supports for the transported card 3. The two transport rollers 4, 5 are mounted on a pivot arm 8, which can be pivoted against the action of a restoring spring (not shown) in a plane at right angles to the card path. The rigidly mounted pivot axis 9 of the pivot arm 8 is provided before the two transport rollers 4, 5 in the card infeed direction 2 so that their axes of rotation 10, 11 are spaced away from the pivot axis 9.

As long as the card 3 has not yet been fed into the card reader 1, the transport rollers 4, 5 lie in contact with their opposing rollers 6, 7 with a force applied by the restoring spring (FIG. 1a). When the card 3 is fed in between the rear transport roller 4 and its opposing roller 6, the pivot arm 8 is pivoted in a clockwise direction about the pivot axis 9 until the rear transport roller 4 is lifted off its opposing roller 6 by the card thickness (FIG. 1b). Due to the pivoted pivot arm 8, the front transport roller 5 is also lifted off its opposing roller 7, however by less than the card thickness. Driven by the rear transport roller 4, the card 3 is transported further in the infeed direction 2 until it comes between the front transport roller 5 and its opposing roller 7. As a result of this, the pivot arm B is pivoted still further in the clockwise direction until the front transport roller 5 is lifted off its opposing roller 7 by the card thickness (FIG. 1c). The rear transport roller 6, which is spaced further from the pivot axis 9 than the front transport roller 5, is then lifted off by more than the card thickness and is thus fully pivoted out of the card path. Thus, the card 3, driven by the front transport roller 5, can be moved past a write/read head 13 for an exchange of data in and against the infeed direction (double arrow 12) without the rear transport roller 4 hindering this movement.

The card reader 20 shown schematically in FIGS. 2a–2d includes two pivot arms 21, 22 as well as three transport rollers 23, 24, 25 arranged one after the other in the infeed direction 2. The pivot arms 21, 22 can be pivoted in each case against the action of restoring springs (not shown) in a plane at right angles to the card path. The rigidly mounted pivot axis 26 of the pivot arm 21, which extends rearwards, is situated in front of the rigidly mounted pivot axis 27 of the pivot arm 22, which extends forwards (i.e. in the infeed direction 2). Between their pivot axes 26, 27, the two pivot arms 21, 22 are connected together in an articulated manner via a common axis of rotation 28 and are thus coupled together so that their movements oppose one another. The rear transport roller 23 is mounted about the axis of rotation 29 at the free end of the pivot arm 21 and the front transport roller 25 is mounted about the axis of rotation 30 at the free end of the pivot arm 22 while the middle transport roller 24 is mounted about the common axis of rotation 28.

Figure 2A:
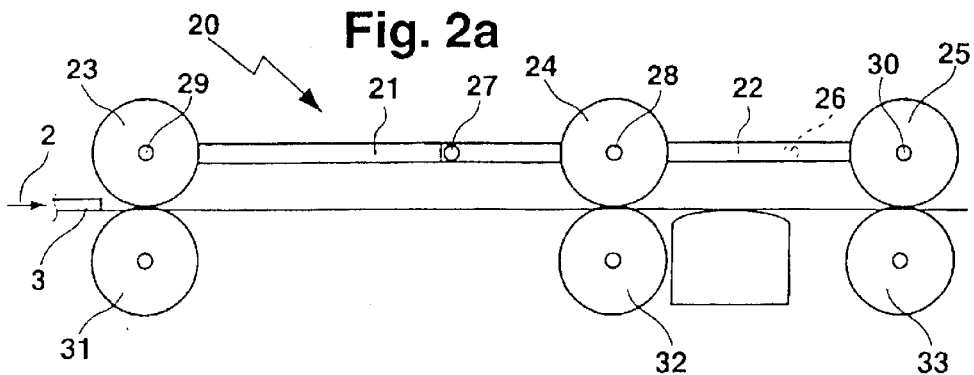
FIGS. 2a–2d show schematically the sequence of movement in a card reader according to the invention with two pivot arms when feeding in a card at four different points in time.
Figure 2B:
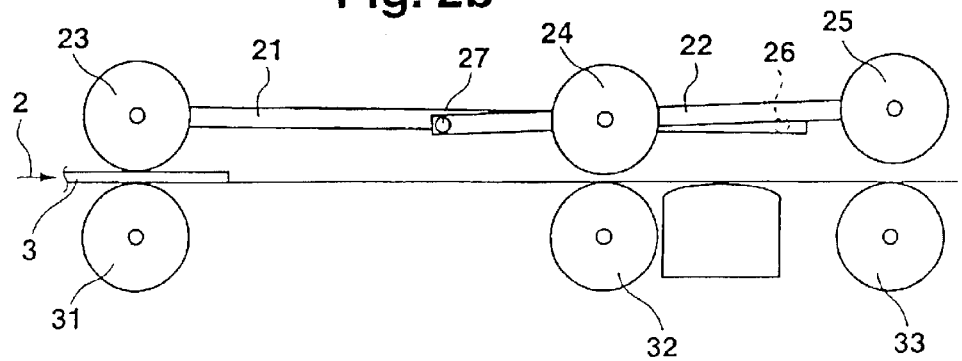
Figure 2C:
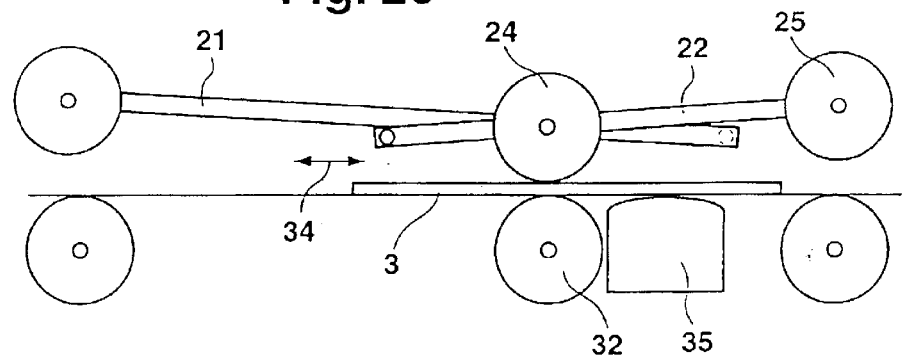
Figure 2D:
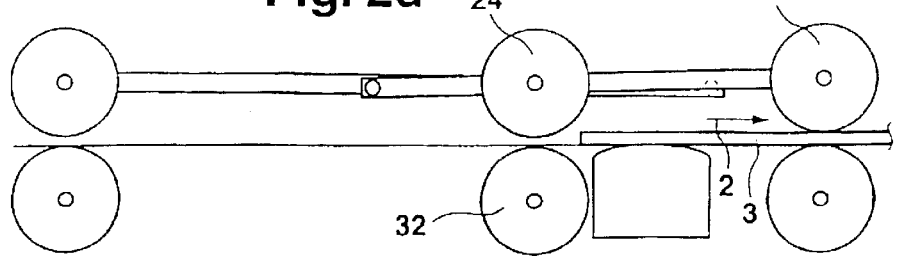

As long as the card 3 has not yet been fed into the card reader 20, the transport rollers 23, 24, 25 lie in contact with their opposing rollers 31, 32, 33 with a force applied by the restoring springs (FIG. 2a). When the card 3 is fed in between the rear transport roller 23 and its opposing roller 31, the pivot arm 21 is pivoted in a clockwise direction about its pivot axis 26 until the rear transport roller 23 is lifted off its opposing roller 31 by the card thickness. Due to the pivoted pivot arm 21, the common middle transport roller 24 is also lifted off its opposing roller 32, however by less than the card thickness. The other pivot arm 22 is also pivoted in an anticlockwise direction about its pivot axis 27 by the lifted-off middle transport roller 24 and thus the front transport roller 25 is also lifted off its opposing roller 33 (FIG. 2b). Driven by the rear transport roller 23, the card 3 is transported further in the infeed direction 2 until it comes between the middle transport roller 24 and its opposing roller 32. As a result of this, the pivot arm 21 is pivoted still further in the clockwise direction and the pivot arm 22 is pivoted still further in the anticlockwise direction until the middle transport roller 24 is lifted off its opposing roller 32 by the card thickness. The front and rear transport rollers 23, 25 are then lifted off by more than the card thickness and are thus fully pivoted out of the card path. The card 3, driven only by the middle transport roller 24, can be moved past a write/read head 35 for an exchange of data in and against the infeed direction 2 (double arrow 34) without the front and rear transport rollers 23, 25 hindering this movement (FIG. 2c). As soon as the card 3, which has been transported further in the infeed direction 2, is no longer between middle transport roller 24 and opposing roller 32, the two pivot arms 21, 22 pivot back under the action of the restoring springs until the front transport roller 25 comes into contact with the card 3 and is thus only still lifted off by the card thickness (FIG. 2d).

Figure 3:
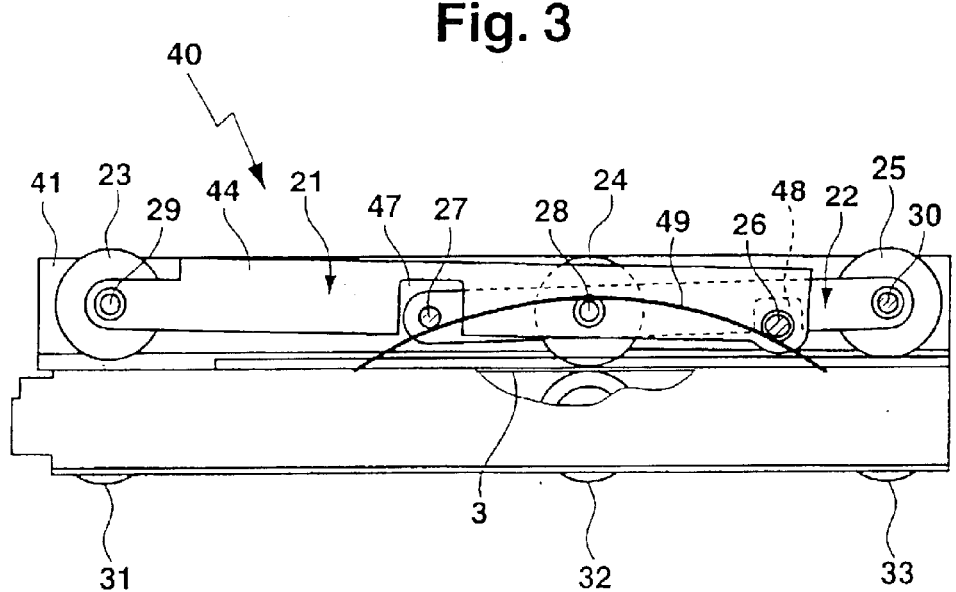
FIG. 3 shows an exemplary embodiment of the card reader according to the invention with two pivot arms and a fed-in card in a longitudinal section according to III—III in FIG. 4.
Figure 4:
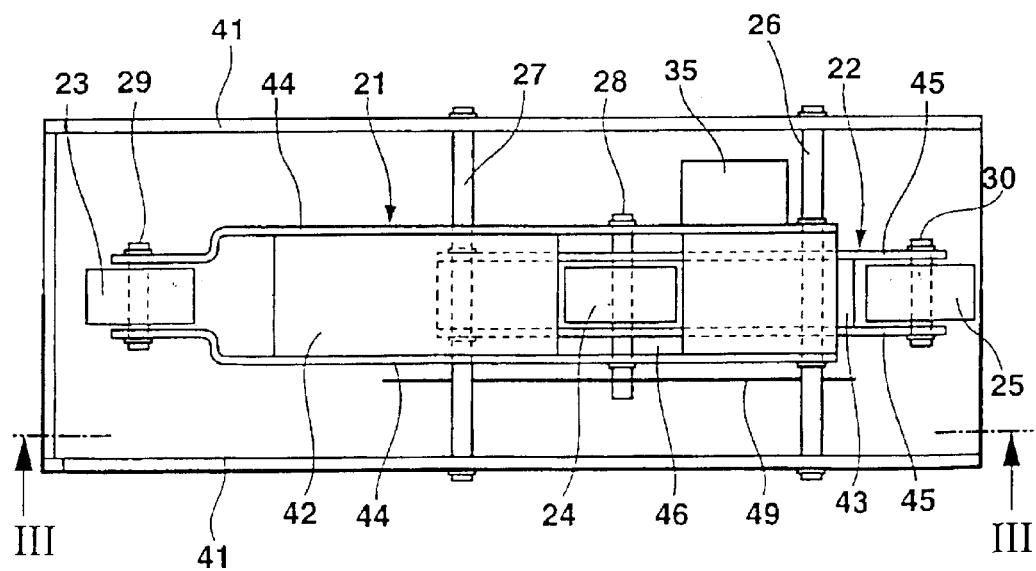
FIG. 4 shows a plan view of the card reader shown in FIG. 3.

A concrete exemplary embodiment of a card reader 40 is shown in FIG. 3 and FIG. 4, the same reference numbers being used as in FIG. 2 for components with the same function. The two pivot axes 26, 27 are held rigidly mounted between the two side housing walls 41 of the card reader 40. The two pivot arms 21, 22 are designed to be U-shaped in cross section with base surfaces 42 and 43 respectively and side walls 44 and 45 respectively, the pivot arm 22 being narrower than the pivot arm 21 and encroaching between its side walls 44. The pivot axis 29 is retained in the two side walls 44 and the pivot axis 30 in the side walls 45 so that the transport rollers 23 and 24 are situated between the side walls 44 and 45 respectively. The common axis of rotation 28 is retained both in the side walls 44 and in the side walls 45, the middle transport roller 24 being situated between the side walls 45. A recess 46 is provided in the base surface 42 of the pivot arm 21, through which the middle transport roller 24 protrudes when it is lifted off (FIG. 3). So that the pivot axes 26, 27 do not hinder the movement of the pivot arms 21, 22, appropriate recesses 47, 48 are provided in the side walls 44, 45 in the area of the pivot axes 26, 27. A leg spring 49 supported on the pivot axes 27, 28 lies in contact with the axis of rotation 28, so that the two pivot arms 21, 22 with their transport rollers 23, 24, 25 are pre-stressed in contact with the opposing rollers 31, 32, 33.

Finally, reference is made once more to the fact that, contrary to the arrangement shown in the figures, the write/read head 13 or 35 is preferably arranged coincidentally with the opposing roller 7 or 32 respectively, i.e. at the level of the transport roller 5 or 24 respectively. The shown arrangement of the write/read head 13 or 35 offset with respect to the opposing roller 7 or 32 respectively was selected simply for better clarity.

What is claimed is:

1. Card reader apparatus comprising:
    at least two transport rollers for an infeed card, the transport rollers being arranged one after another in a card infeed direction;
    a first pivot arm for supporting the transport rollers, the first pivot arm being pivotable about a first pivot axis against a restoring force action in a plane at right angles to the card infeed direction, the transport rollers being disposed at a spaced apart distance from the first pivot axis and the first pivot axis being disposed behind the transport roller in the card infeed direction; and
    second transport rollers and a second pivot arm for supporting the second transport rollers, the second pivot arm being pivotable about a second pivot axis, the second pivot axis being disposed before the second transport rollers in the card infeed direction, the first pivot arm and second pivot arm being coupled together so that movement of the first pivot arm and second pivot arm oppose one another.

2. Card reader apparatus according to claim 1 wherein the first pivot arm and the second pivot arm are connected together in an articulated manner between the pivot axis and the second pivot axis.

3. Card reader apparatus according to claim 1 wherein the two pivot arms are connected together in an articulated manner via an axis of rotation of a transport roller common to both pivot arms.

4. Card reader according to claim 1, wherein a read and/or write head of the card reader is provided in the area of the common transport roller.

5. Card reader according to claim 1, wherein a restoring force is formed by a spring acting on the articulated connection of the two pivot arms.

6. Card reader according to claim 1, wherein the transport rollers are mounted between two side walls of the first pivot arm, the first pivot arm being U-shaped in cross section.

7. Card reader according to claim 1, wherein the first pivot arm and second pivot arm are U-shaped and the first pivot arm is narrower than the second pivot arm and encroaches between two side walls of the second pivot arm.

8. Card reader apparatus according to claim 1 wherein the two pivot arms are connected together in an articulated manner between their two pivot axes, wherein the two pivot arms are connected together in an articulated manner via the axis of rotation of a transport roller common to both pivot arms, wherein a read and/or write head of the card reader is provided in the area of the common transport roller, wherein the restoring force is formed by a spring acting on the articulated connection of the two pivot arms, and wherein an opposing roller is provided for each transport roller, on a side of the card path opposite the transport rollers, as an opposing support for the transported card.

9. Card reader apparatus according to claim 8, wherein the transport rollers are mounted between two side walls of the pivot arm, which is U-shaped in cross section, the second pivot arm is U-shaped in arm section and the U-shaped pivot arm is narrower than the second U-shaped pivot arm and encroaches between two side walls of the second pivot arm.

10. Card reader apparatus according to claim 1 wherein the two pivot arms are connected together in an articulated manner between their two pivot axes, wherein the two pivot arms are connected together in an articulated manner via the axis of rotation of a transport roller common to both pivot arms, wherein a read and/or write head of the card reader is provided in the area of the common transport roller, wherein the restoring force is formed by a spring acting on the articulated connection of the two pivot arms, and wherein an opposing roller is provided for each transport roller, on a side of the card path opposite the transport rollers, as an opposing support for the transported card.

11. Card reader according to claim 10, wherein the transport rollers are mounted between the two side walls of a pivot arm, which is U-shaped in cross section, and wherein the one U-shaped pivot arm is narrower than the second U-shaped pivot arm and encroaches between two side walls of the second pivot arm.

* * * * *